US008956699B2

(12) United States Patent  (10) Patent No.: US 8,956,699 B2
Rau et al.  (45) Date of Patent: Feb. 17, 2015

(54) METHOD FOR COATING METAL SURFACES WITH A WAX-CONTAINING LUBRICANT COMPOSITION

(75) Inventors: Uwe Rau, Frankfurt (DE); Klaus-Dieter Nittel, Frankfurt (DE)

(73) Assignee: Chemetall GmbH, Frankfurt (DE)

(*) Notice: Subject to any disclaimer, the term of this patent is extended or adjusted under 35 U.S.C. 154(b) by 1013 days.

(21) Appl. No.: 12/863,812

(22) PCT Filed: Jan. 26, 2009

(86) PCT No.: PCT/EP2009/050852
§ 371 (c)(1),
(2), (4) Date: Nov. 12, 2010

(87) PCT Pub. No.: WO2009/095374
PCT Pub. Date: Aug. 6, 2009

(65) Prior Publication Data
US 2011/0045188 A1  Feb. 24, 2011

(30) Foreign Application Priority Data
Jan. 30, 2008 (DE) .................. 10 2008 000 186

(51) Int. Cl.
*B05D 3/10* (2006.01)
*C10M 173/02* (2006.01)
*C10M 111/04* (2006.01)

(52) U.S. Cl.
CPC ........... *C10M 173/02* (2013.01); *C10M 111/04* (2013.01); *C10M 2201/041* (2013.01); *C10M 2201/062* (2013.01); *C10M 2201/066* (2013.01); *C10M 2201/102* (2013.01); *C10M 2205/022* (2013.01); *C10M 2205/024* (2013.01); *C10M 2205/04* (2013.01); *C10M 2205/16* (2013.01); *C10M 2205/18* (2013.01); *C10M 2209/084* (2013.01); *C10M 2209/103* (2013.01); *C10M 2215/042* (2013.01); *C10M 2217/044* (2013.01); *C10M 2217/045* (2013.01); *C10M 2217/046* (2013.01); *C10M 2227/02* (2013.01); *C10M 2227/04* (2013.01); *C10M 2229/02* (2013.01); *C10N 2220/021* (2013.01); *C10N 2220/022* (2013.01); *C10N 2230/02* (2013.01); *C10N 2230/06* (2013.01); *C10N 2230/12* (2013.01); *C10N 2240/402* (2013.01); *C10N 2240/405* (2013.01); *C10N 2240/407* (2013.01); *C10N 2240/408* (2013.01); *C10N 2240/409* (2013.01); *C10N 2250/121* (2013.01); *C10N 2250/141* (2013.01); *C10N 2280/00* (2013.01)
USPC .......................................... 427/301; 524/118

(58) Field of Classification Search
USPC .......................................... 427/301; 508/118
See application file for complete search history.

(56) References Cited

U.S. PATENT DOCUMENTS

| 3,788,988 | A |   | 1/1974  | Dubourg          |         |
|-----------|---|---|---------|------------------|---------|
| 3,933,658 | A |   | 1/1976  | Beiswanger et al.|         |
| 4,199,381 | A |   | 4/1980  | Nuss et al.      |         |
| 4,517,029 | A |   | 5/1985  | Sonoda et al.    |         |
| 4,668,193 | A |   | 5/1987  | Burgess et al.   |         |
| 5,415,701 | A |   | 5/1995  | Nittel et al.    |         |
| 5,531,912 | A |   | 7/1996  | Church et al.    |         |
| 5,584,945 | A |   | 12/1996 | Nittel et al.    |         |
| 6,034,041 | A | * | 3/2000  | Nittel et al.    | 508/474 |
| 6,472,352 | B1|   | 10/2002 | Hacias           |         |
| 6,482,273 | B1|   | 11/2002 | Nittel et al.    |         |
| 6,482,871 | B1|   | 11/2002 | Aasen et al.     |         |
| 6,638,370 | B2|   | 10/2003 | Boulos           |         |
| 7,651,556 | B2|   | 1/2010  | Komiyama et al.  |         |
| 8,445,106 | B2|   | 5/2013  | Itou et al.      |         |
| 2003/0000418 | A1 |   | 1/2003 | Boulos         |         |
| 2003/0160446 | A1 | * | 8/2003 | Goto et al.    | 285/94  |
| 2004/0101697 | A1 | * | 5/2004 | Chida et al.   | 428/461 |
| 2004/0156995 | A1 | * | 8/2004 | Komiyama et al.| 427/376.2 |
| 2004/0221924 | A1 |   | 11/2004| Nittel et al.  |         |
| 2006/0003901 | A1 | * | 1/2006 | Sohi           | 508/139 |
| 2006/0233955 | A1 |   | 10/2006| Smith et al.   |         |
| 2006/0237099 | A1 |   | 10/2006| Schneider et al.|        |
| 2008/0107910 | A1 |   | 5/2008 | Chida et al.   |         |
| 2008/0166575 | A1 |   | 7/2008 | Nittel et al.  |         |
| 2011/0086171 | A1 |   | 4/2011 | Nittel et al.  |         |

FOREIGN PATENT DOCUMENTS

| DE | 4445993         |    | 6/1996  |
|----|-----------------|----|---------|
| DE | 102005023023    | A1 | 11/2006 |
| EP | 0 711 821       |    | 5/1996  |
| EP | 0 711 821       | A  | 5/1996  |
| EP | 1 454 965       | A1 | 9/2004  |
| EP | 1749866         | A1 | 2/2007  |
| JP | 2002-24241959   | A  | 8/2002  |
| JP | 2006-143988     |    | 6/2006  |
| JP | 2007-268587     | A  | 10/2007 |

* cited by examiner

*Primary Examiner* — Nathan T Leong
(74) *Attorney, Agent, or Firm* — James R. Crawford; Fulbight & Jaworski LLP

(57) ABSTRACT

The invention relates to a method for preparing metal workpieces for cold forming by applying a lubricant layer either to a metal surface or to a metal surface which has been precoated with e.g., a conversion coating. The lubricant layer is formed by contacting the surface with an aqueous lubricant composition which has a content in at least two waxes having distinct properties and a content in organic polymer material, the organic polymer material used predominantly being monomers, oligomers, co-oligomers, polymers and copolymers based on ionomer, acrylic acid/methacrylic acid, epoxide, ethylene, propylene, styrene, urethane, the ester or salt thereof. The invention to the corresponding lubricant composition, to the lubricant layer produced thereof and to its use.

27 Claims, No Drawings

METHOD FOR COATING METAL SURFACES WITH A WAX-CONTAINING LUBRICANT COMPOSITION

RELATED APPLICATIONS

This application is a §371 application from PCT/EP2009/050852 filed Jan. 26, 2009, which claims priority from German Patent Application No. 10 2008 000 186.4 filed Jan. 30, 2008, each of which is herein incorporated by reference in its entirety.

The invention relates to a process for the coating of metallic surfaces first with an aqueous acidic phosphatising solution and then with a lubricant composition in the form of an aqueous solution or dispersion based on polymeric organic material with a content of at least one organic polymeric material of ionomer, other polymer/copolymer and/or derivatives thereof as well as, optionally, of at least one wax, of at least one water-soluble, water-containing and/or water-binding oxide and/or silicate, of at least one solid lubricant, of at least one friction modifier and/or of at least one other additive as well as a corresponding lubricant composition which is intended in particular to facilitate the cold forming of a metallic shaped article after the formation of a coating on this shaped article. Cold forming can generally take place at surface temperatures of up to about 450° C. but without the input of heat. Heating takes place during this process only as a result of the forming and optionally the preheating of the workpieces to be formed. However, the temperature of the workpieces to be formed is generally approx. 20° C. However, where the workpieces to be formed are previously heated to temperatures in the range of 650 to 850° C. or 900 to 1250° C., the process is known as semi-hot or hot forming.

While forming oils are generally used for the cold forming of metallic shaped articles with relatively low degrees of deformation and correspondingly lower forces, for much higher degrees of deformation at least one coat is usually employed as a separating layer between workpiece and tool in order to avoid cold welding of workpiece and tool. For the latter, it is conventional to provide the workpieces with at least one coat of a lubricant or with a lubricant composition in order to reduce the friction resistance between the surface of the workpiece and the forming tool. Cold forming includes:

slide drawing (forming under a combination of tensile and compressive conditions), e.g. of welded or seamless tubes, hollow profiles, rods, solid profiles or wires, ironing and/or deep drawing, e.g. of strips, sheets or hollow parts to form hollow parts, cold extrusion (forming under compressive conditions), e.g. of hollow or solid parts and/or cold heading, e.g. of wire sections to form joining elements such as e.g. nut or screw blanks.

In the past, the metallic shaped articles for cold forming were virtually only prepared either by applying a fat, an oil or an oil emulsion or by first coating with zinc phosphate and then coating either with a soap, especially based on alkali or alkaline-earth stearate, and/or with a solid lubricant, especially based on molybdenum sulfide, tungsten sulfide and/or carbon. However, a coat containing a soap finds its upper application limit at moderate forces and moderately high temperatures. A solid lubricant was only used for moderately heavy or heavy cold-forming operations. For the cold forming of stainless steels, coats of chloroparaffins were often used, but these are used reluctantly today for reasons of environmental protection. However, sulfide-containing coats have a detrimental effect on stainless steel.

In individual cases, coating first with zinc phosphate and then either with oil or with a certain organic polymeric composition was then begun. If necessary, either at least one solid lubricant, such as e.g. molybdenum disulfide and/or graphite, was added to the organic polymeric composition (second coat, with zinc phosphate being selected as the first coat) or this at least one solid lubricant was applied on to the organic polymeric coat as a third coat. While molybdenum disulfide can be used up to temperatures of about 450° C., graphite can be employed up to temperatures of about 1100° C., although its lubricating effect does not start until about 600° C. These coating sequences are conventional to the present day.

DE-A-44 45 993 describes a lubricant concentrate for cold forming with a content of polyethylene, polyacrylic acid and styrene/acrylic acid copolymer having specific properties, as well as the corresponding process for applying the lubricant coating. Waxes are not expressly mentioned. However, this lubricant system has the disadvantage that the viscosity decreases relatively steeply at high temperatures and that, even for moderately heavy forming operations, it requires an additional solid lubricant such as e.g. molybdenum disulfide and/or graphite. The sulfidic solid lubricants are necessary especially at high temperatures. However, they have the disadvantage that the sulfides are not resistant to hydrolysis and are readily converted to sulfurous acid. The sulfurous acid can readily cause corrosion if the coat is not removed from the workpiece immediately after it has been cold-formed.

The aforementioned lubricant systems do not meet the requirements, which have now become significantly higher, for strain, pressing accuracy (net shape) and strain rate. In addition, environmental compatibility and industrial hygiene must be taken into consideration. Furthermore, the excess lubricant residues must not be deposited at one point on the tool, since this affects the pressing accuracy of the workpieces and increases rejects. It is advantageous if the coating and deposits can be readily removed from the workpiece, the tool and the plant after forming has taken place.

The [sic] on the same day at the same patent office on closely related processes of cold forming, their compositions and their coatings filed patent applications as well as their priority applications DE 102008000187.2, DE 102008000186.4 and DE 102008000185.6 are expressly incorporated herein, especially also with regard to their substance groups, substances and contents thereof, with regard to their examples and comparative examples and with regard to the respective process conditions.

The object therefore existed of proposing an alternative coating process which enables the most environmentally friendly coating possible to be formed on metallic workpieces, especially of steel, in a simple and cost-effective manner and which, in some embodiments, if necessary, is suitable for moderately heavy and/or particularly heavy cold-forming operations. In a further object, the coating should if necessary be simple to remove from the formed workpiece after cold forming.

The object is achieved by a process for the preparation of metallic workpieces for cold forming by applying a lubricant layer (=coating) either on to a metallic surface or on to a metallic surface that has been pre-coated, e.g. with a conversion coating, wherein the lubricant layer is formed by contacting the surface with an aqueous lubricant composition which has a content of at least two waxes with markedly different properties as well as a content of organic polymeric material, and wherein predominantly monomers, oligomers, co-oligomers, polymers and/or copolymers based on ionomer, acrylic acid/methacrylic acid, epoxide, ethylene, polyamide, propylene, styrene, urethane, their ester(s) and/or salt(s) are used as the organic polymeric material and wherein the coating formed from the lubricant composition has several consecutive softening ranges/softening points and/or melting ranges/melting points over a relatively large temperature range, which is passed through when the metallic workpiece heats up as a result of coldforming so that there is a substantially continuous change or an approximately graduated change in the thermal and/or mechanical properties and/or the viscosity of the coatings during cold forming.

Surprisingly, it has been found that, with a content of at least two waxes with markedly different properties in the lubricant composition and/or in the coating formed therefrom, cold forming is markedly simplified in numerous embodiments compared with the content of only one wax, so that under otherwise comparable conditions it was also possible to carry out a heavier cold forming than previously. As a result, using substantially the same lubricant composition and/or the coating formed therefrom, other types of cold forming in which higher rates of forming, higher forces and/or higher temperatures occur could also be successfully carried out. Preferably, in the lubricant compositions according to the invention and/or in the coatings formed therefrom, waxes are used whose melting ranges/melting points $T_m$ are at least 20° C. apart, preferably in each case at least 30, 40, 50, 60, 70 or 80° C., and/or the viscosities of which at a specific elevated or high temperature in the range of the surface temperatures of the workpiece to be formed during cold forming differ by at least 5% or by at least 8% in their viscosity. The evaporation behaviour of two waxes with a similar melting range/melting point can also differ markedly.

The process according to the invention is particularly used to facilitate, improve and/or simplify the cold forming of metallic shaped articles.

The term "lubricant composition" characterises the stages from the aqueous via the drying to the dry lubricant composition as a chemical composition, phase-related composition and mass-related composition, while the term "coating" denotes the dry, heated, softening and/or melting coat which is formed and/or was formed from the lubricant composition, including its chemical composition, phase-related composition and mass-related composition. The aqueous lubricant composition can be a dispersion or solution, especially a solution, colloidal solution, emulsion and/or suspension. It generally has a pH in the range from 7 to 14, especially from 7.5 to 12.5, or from 8 to 11.5, particularly preferably from 8.5 to 10.5 or from 9 to 10.

The lubricant composition and/or the coating formed therefrom preferably has/have a content of at least one water-soluble, water-containing and/or water-binding oxide and/or silicate as well as a content of at least one ionomer, at least one non-ionomer and/or at least two waxes as well as, optionally, a content of at least one additive. Particularly preferably, in some embodiments it additionally has at least one content in each case of acrylic acid/methacrylic acid and/or styrene, especially as (a) polymer(s) and/or as (a) copolymer(s) which is/are not (an) ionomer(s). The lubricant composition and/or the coating formed therefrom each preferably has/have a content of at least 5 wt. % in each case of at least one ionomer and/or non-ionomer.

The organic polymeric material preferably consists substantially of monomers, oligomers, co-oligomers, polymers and/or copolymers based on ionomer, acrylic acid/methacrylic acid, epoxide, ethylene, polyamine, propylene, styrene, urethane, the ester(s) and/or salt(s) thereof. The term "ionomer" here includes a content of free and/or associated ions.

Oxides and/or Silicates:

Surprisingly, it has been found that, even with a very small addition of water-soluble, water-containing and/or water-binding oxide and/or silicate, such as e.g. water glass, to a substantially organic polymeric composition, a marked improvement in cold forming is achieved under otherwise identical conditions in numerous embodiments, and greater deformation can be achieved than with comparable lubricant compositions that are free from these compounds. On the other hand, it has been shown that workpieces with a coating having a very high content of water-soluble, water-containing and/or water-binding oxide and/or silicate in an otherwise substantially organic polymeric composition can also be formed very advantageously. For some embodiments, an optimum has been established which is more in the lower and/or medium composition range.

In tests over a relatively broad product range it has been found that, with the lubricant compositions and/or coatings according to the invention, it is possible, to a much greater extent than previously, to dispense with an additional solid lubricant layer based on sulfidic lubricant, e.g. made of molybdenum disulfide, on the one hand and with a third coat based on sulfidic solid lubricant on the other hand. In the first case, this solid lubricant layer is the second coat and in the second case, the third coat, which follows a zinc phosphate layer as the first coat. The possibility of partially dispensing with the use of solid lubricant not only represents a perceptible saving in terms of labour and costs and a simplification, but also saves at least one expensive, environmentally unfriendly substance which causes marked blackening and is problematic with regard to contamination and corrosion sensitivity.

While, in the past, this product range would have been coated with soap for approx. 60% of the product range and, for the remaining approx. 40% of the product range, with molybdenum disulfide and optionally with graphite as a second layer in each case after a zinc phosphate layer, this product range would today be more likely to be coated first with a zinc phosphate layer, then with a conventional organic polymeric lubricant composition and optionally additionally, if required, with a third coat based on sulfidic solid lubricant and optionally additionally on graphite. Sulfidic solid lubricant was needed for all moderately heavy and heavy cold-forming operations. Since the soap layer did not enable precise cold-forming operations to be carried out—i.e. no high pressing accuracies of the formed workpieces—the organic polymeric lubricant composition, which is significantly superior to the soap coat, had been introduced in individual cases despite the higher costs. However, it was free from water-soluble, water-containing and/or water-binding oxides and/or silicates. In this process sequence, the additional third coat would be necessary for about 40% of the product range. If a zinc phosphate layer is used as the first coat and the lubricant composition according to the invention as the second coat, an additional third coat based on sulfidic solid lubricant is now only necessary for 12 to 20% of the product range.

The water-soluble, water-containing and/or water-binding oxide and/or silicate can preferably be in each case at least one water glass, silica gel, silica sol, silica hydrosol, silicic acid ester, ethyl silicate and/or in each case at least one of the precipitation products, hydrolysis products, condensation products and/or reaction products thereof, especially a lithium-, sodium- and/or potassium-containing water glass. A content of water in the range from 5 to 85 wt. %, based on the solids content, is preferably bound and/or coupled to the water-soluble, water-containing and/or water-binding oxide and/or silicate, preferably in the range from 10 to 75, from 15 to 70, from 20 to 65, from 30 to 60 or from 40 to 50 wt. %, the typical water content being able to exhibit distinctly different water contents depending on the nature of the oxide and/or silicate. The water can be bound and/or coupled to the solid e.g. on the basis of solubility, adsorption, wetting, chemical bonding, porosity, complex particle shape, complex aggregate shape and/or intermediate layers. These substances bound and/or coupled to water obviously act in a similar way to a lubricating layer in the lubricant composition and/or in the coating. It is also possible to use a mixture of two or of at least three substances from this group. In addition to or instead of sodium and/or potassium, other cations can be contained, especially ammonium ions, alkali ions other than sodium and/or potassium ions, alkaline-earth ions and/or transition-metal ions. The ions can be or can have been at least partly substituted. The water in the water-soluble, water-containing and/or water-binding oxide and/or silicate can be present at least partly in each case as water of crystallisation, as a solvent, adsorbed, bound to a pore space, in a dispersion, in an emulsion, in a gel and/or in a sol. At least one water glass is particularly preferred, especially a sodium-containing water glass. Alternatively or in addition, there can also be a content of at least one oxide, e.g. of at least one silicon dioxide and/or magnesium oxide in each case and/or of at least one silicate in each case, e.g. of at least one sheet silicate, modified silicate and/or alkaline-earth silicate in each case. Preferably this at least one oxide and/or silicate in each case is present in dissolved form, in nanocrystalline form, as a gel and/or as a sol. A solution can optionally also be present as a colloidal solution. Where the water-soluble, water-containing and/or water-binding oxide and/or silicate is present in particulate form, it is preferably present as very fine particles, especially with an average particle size of less than 0.5 μm, less than 0.1 or even less than 0.03 μm, determined in each case using a laser particle measuring device and/or nanoparticle measuring device.

The water-soluble, water-containing and/or water-binding oxides and/or silicates help to increase the viscosity of the dried, softening and melting coating in many embodiments and often act as a binder, a water repellent and an anti-corrosion agent. It has been shown that, among the water-soluble, water-containing and/or water-binding oxides and/or silicates, water glass behaves particularly favourably. By adding, for example, 2 to 5 wt. % water glass—based on solids and active substances—to the aqueous lubricant composition, the viscosity of the dried, softening and melting coating is significantly increased in many embodiments, especially at temperatures of more than 230° C., compared with a lubricant composition on the same chemical basis but without the addition of water glass. As a result, higher mechanical stress becomes possible during cold forming. As a result, it has also become possible for the first time to use cold extrusion for many compositions and applications, which would not be possible without this addition. Tool wear and the number of tool changeovers can be drastically reduced by this. The manufacturing costs are also significantly reduced as a result.

It has been shown that the tool becomes cleaner and brighter as the proportion of water glass in the lubricant composition increases, with otherwise identical working conditions and basic composition. On the other hand, it was also possible to increase the content of water glass in the lubricant composition to up to about 85 wt. % of the solids and active substances and still achieve good to very good results. With contents of more than 80 wt. % of the solids and active substances, wear increases significantly. An optimum obviously lies somewhere in the lower and/or medium content range, since with very high contents tool wear also increases again slowly. With an addition based on titanium dioxide or titanium oxide sulfate, somewhat more marked wear than with a water glass addition was found although, in principle, the addition has proved useful. A disilicate addition has also been shown to be advantageous.

The content of water-soluble, water-containing and/or water-binding oxides and/or silicates in the lubricant composition and/or in the coating formed therefrom is preferably 0.1 to 85, 0.3 to 80 or 0.5 to 75 wt. % of the solids and active substances, particularly preferably 1 to 72, 5 to 70, 10 to 68, 15 to 65, 20 to 62, 25 to 60, 30 to 58, 35 to 55 or 40 to 52 wt. % of the solids and active substances, determined without the water content bound and/or coupled thereto. The weight ratio of the contents of water-soluble, water-containing and/or water-binding oxides and/or silicates to the content of ionomer(s) and/or non-ionomer(s) in the lubricant composition and/or in the coating is preferably in the range from 0.001:1 to 0.2:1, particularly preferably in the range from 0.003:1 to 0.15:1, from 0.006:1 to 0.1:1 or from 0.01:1 to 0.02:1.

Ionomers:

The ionomers represent a particular type of polyelectrolytes. They preferably consist substantially of ionomeric copolymers, optionally together with corresponding ions, monomers, comonomers, oligomers, co-oligomers, polymers, their esters and/or salts. Block copolymers and graft copolymers are regarded as a subgroup of the copolymers. The ionomers are preferably compounds based on acrylic acid/methacrylic acid, ethylene, propylene, styrene, the ester(s) thereof and/or the salts) thereof or mixtures with at least one of these ionomeric compounds. The lubricant composition and/or the coating formed therefrom can have either no content of ionomer, or a content of at least one ionomer in the range from 3 to 98 wt. % of the solids and active substances. The content of at least one ionomer is preferably from 5 to 95, 10 to 90, 15 to 85, 20 to 80, 25 to 75, 30 to 70, 35 to 65, 40 to 60 or 45 to 55 wt. % of the solids and active substances in the lubricant composition and/or the coating formed therefrom. Depending on the desired property spectrum and on the application of certain workpieces to be formed and cold-forming operations, the composition of the lubricant composition and/or the coating formed therefrom can be differently oriented and can vary greatly.

The lubricant composition and/or the coating produced therefrom can preferably contain at least one ionomer with a substantial content of at least one copolymer, particularly of a copolymer based on polyacrylate, polymethacrylate, polyethylene and/or polypropylene. An ionomer optionally has a glass transition temperature $T_g$ in the range from −30° C. to +40° C., preferably in the range from −20 to +20° C. The molecular weight of the ionomer is preferably in the range from 2 000 to 15 000, particularly preferably in the range from 3 000 to 12 000 or from 4 000 to 10 000. Particularly preferably, the lubricant composition and/or the coating formed therefrom contain(s) at least one ionomer based on ethylene acrylate and/or ethylene methacrylate, preferably one with a molecular weight in the range from 3 500 to 10 500—particularly preferably in the range from 5 000 to 9 500—and/or with a glass transition temperature $T_g$ in the range from −20° C. to +30° C. In at least one ionomer based on ethylene acrylate and/or ethylene methacrylate, the acrylate content can be up to about 25 wt. %. A somewhat higher molecular weight may be advantageous for coatings that are able to withstand greater stress, as there have been indications of tendencies that a higher molecular weight of the ionomer and that a higher viscosity of the composition in the temperature range from about 100° C. up to the order of magnitude of approx. 300, 350 or 400° C. have an advantageous effect on the ability of the coatings produced therewith to withstand mechanical stress, permitting heavier cold-forming operations. Especially during drying and/or cold forming, a crosslinking of the ionomer, e.g. with, in each case, at least one amine, carbonate, epoxide, hydroxide, oxide, surfactant and/or with at least one compound containing carboxyl groups can optionally take place. The higher the proportion of the ionomer in the lubricant composition and/or in the coating, the heavier the cold-forming operations possible in many embodiments. Some ionomer additions are also used to guarantee lubrication and reduce friction even in the initial stage of cold forming, especially with a cold workpiece and a cold tool. This is all the more important the simpler and/or weaker the cold forming and the lower the forming temperature.

The melting point of the at least one ionomer is preferably in the range from 30 to 85° C. in many embodiments. Its glass transition temperature is preferably less than 35° C. At least one ionomer is preferably added as a dispersion.

Non-Ionomers:

In addition, other organic polymeric components may be contained in the lubricant composition and/or in the coating formed therefrom, especially in the polymeric organic material, such as e.g. oligomers, polymers and/or copolymers based on acrylic acid/methacrylic acid, amide, amine, aramid, epoxide, ethylene, imide, polyester, propylene, styrene, urethane, their ester(s), and/or salt(s), which cannot be regarded as ionomers (="non-ionomers"). These also include, for example, polymers/copolymers based on acrylic acid, acrylic acid esters, methacrylic acid, methacrylic acid esters, fully aromatic polyamides, fully aromatic polyesters, fully aromatic polyimides and/or styrene acrylates. Block copolymers and graft copolymers are regarded as a subgroup of the copolymers.

Depending on the embodiment, they are used to increase viscosity at elevated temperature, as lubricants, as high-temperature lubricants, to raise the viscosity especially in the temperature range from 100 to 250, from 100 to 325 or even from 100 to 400° C., as high-temperature-resistant substances, as substances with wax-like properties, as thickeners (=viscosity regulators), as additives, to achieve additional softening ranges/softening points and/or melting ranges/melting points and/or to formulate the lubricant composition with several softening ranges/softening points and/or melting ranges/melting points in certain temperature intervals. Among other things, some acrylic-containing polymers/copolymers and some styrene acrylates can act as thickeners.

Polyethylene or polypropylene can preferably be modified by propylene, ethylene, the corresponding polymers thereof and/or by other additives such as acrylate. They can preferably exhibit wax-like properties. They can preferably exhibit at least one softening range/softening point and/or at least one melting range/melting point in the range from 80 to 250° C.

The polymers and/or copolymers of these substances preferably have a molecular weight in the range from 1 000 to 500 000. Individual substances preferably have a molecular weight in the range from 1 000 to 30 000, others have one in the range from 25 000 to 180 000 and/or in the range from 150 000 to 350 000. Particularly high molecular weight substances can be used as thickeners. An acrylic and/or a styrene acrylate addition can also have a thickening action. In some embodiments, one, two, three, four or five different non-ionomers are or have been added to the ionomer-containing lubricant composition and/or to the coating. The lubricant composition and/or the coating formed therefrom preferably has/have no content of non-ionomer, or has/have a content of at least one non-ionomer in the range from 0.1 to 90 wt. % of the solids and active substances. Particularly preferably, the content of the at least one non-ionomer is 0.5 to 80, 1 to 65, 3 to 50, 5 to 40, 8 to 30, 12 to 25 or 15 to 20 wt. % of the solids and active substances of the lubricant composition or of the coating.

Both the individual or the pre-mixed ionomers and the individual or the pre-mixed non-ionomers can be added to the aqueous lubricant composition in each case, independently of one another, as a solution, colloidal solution, dispersion and/or emulsion.

Particularly preferably, the lubricant composition contains the following as non-ionomers, which are not waxes within the meaning of this application:
a) 0.1 to 50 wt. % and especially 5 to 30 wt. % substantially of wax-like polyethylene and/or of wax-like polypropylene, in each case with at least one softening range/softening point and/or melting range/melting point above 120° C.,
b) 0.1 to 16 wt. % and especially 3 to 8 wt. % substantially of polyacrylate with a molecular weight in the range from 4 000 to 1 500 000—particularly preferably in the range from 400 000 to 1 200 000—and/or
c) 0.1 to 18 wt. % and especially 2 to 8 wt. % polymer/copolymer based on styrene, acrylic acid and/or methacrylic acid with a molecular weight in the range from 120 000 to 400 000 and/or with a glass transition temperature $T_g$ in the range from 30 to 80° C.

The ionomers and/or non-ionomers can be present at least partly, especially the acrylic acid components of the polymers according to b) and c), preferably under application conditions partly, especially mainly or completely, as salts of inorganic and/or organic cations. Where non-ionomer is also contained in the lubricant composition, the weight ratio of the contents of ionomer(s) to non-ionomer(s) is preferably in the range from 1:3 to 50:1, particularly preferably in the range from 1:1 to 35:1, from 2:1 to 25:1, from 4:1 to 18:1 or from 8:1 to 12:1.

The lubricant composition and/or the coating produced therewith has/have a total content of at least one ionomer and/or non-ionomer preferably of zero or in the range from 3 to 99 wt. % of the solids and active substances in each case. This content is particularly preferably 10 to 97, 20 to 94, 25 to 90, 30 to 85, 35 to 80, 40 to 75, 45 to 70, 50 to 65 or 55 to 60 wt. % of the solids and active substances of the lubricant composition and/or of the coating. Thickeners based on non-ionomers are included herein. Depending on the planned application conditions and cold-forming operations and depending on the formulation of the lubricant composition and/or of the coating, the content of ionomer(s) and/or non-ionomer(s) can vary within broad limits. At least a content of at least one ionomer is particularly preferred.

The entire organic polymeric material—this term is intended to include ionomer(s) and/or non-ionomer(s) but not waxes—preferably has an average acid value in the range from 20 to 300, particularly preferably in the range from 30 to 250, from 40 to 200, from 50 to 160 or from 60 to 100. The term "the entire organic polymeric material" is intended to include ionomer(s) and/or non-ionomer(s) but not waxes.

In many embodiments according to the invention, the lubricant compositions and/or the coatings formed therefrom contain at least two types of organic polymeric substances selected from ionomers and non-ionomers, which in the temperature range from 40 to 260° C. have a total of at least two ranges and/or peaks of softening and/or melting, of which at least two are at least 30° C., preferably at least 40, at least 50 or at least 60° C. apart, wherein an approximately continuous or approximately graduated change in the softening and/or the melting of the coating over the temperature curve during cold forming is preferably achieved. In many embodiments according to the invention, the lubricant compositions and/or the coatings formed therefrom contain at least two types of organic polymeric substances selected from ionomers and non-ionomers which over the temperature range from 40 to 160° C. or from 40 to 260° C. have a total of at least three ranges and/or peaks of softening and/or melting, wherein an approximately continuous or approximately graduated change in the softening and/or the melting of the coating over the temperature curve during cold forming is preferably achieved. The endothermic ranges and/or peaks of softening and/or melting can be determined using DSC apparatus.

In some embodiments, it is particularly preferred that only a decrease in viscosity of no more than 10%, or no decrease in viscosity, of the heating, softening and/or melting coatings occurs over the temperature range from the maximum heat exposure to 50° C. below the maximum heat exposure of the workpieces to be formed during a specific cold-forming operation.

Neutralising Agents:

It is particularly advantageous if at least one ionomer and/or at least one non-ionomer is/are at least partly neutralised, at least partly saponified and/or is/are at least partly present in the lubricant composition and/or in the coating as at least one organic salt. The term "neutralisation" here means the at least partial reaction of at least one organic polymeric substance with a content of carboxyl groups, i.e. in particular of at least one ionomer and/or at least one non-ionomer, with a basic compound (=neutralising agent) in order to form, at least partly, an organic salt (salt formation). Where at least one ester is also reacted here, it is possible to speak of saponification. For the neutralisation of the lubricant composition, preferably at least one primary, secondary and/or tertiary amine, ammonia and/or at least one hydroxide—for example ammonium hydroxide, at least one alkali hydroxide such as e.g. lithium, sodium and/or potassium hydroxide and/or at least one alkaline-earth hydroxide—is used in each case as neutralising agent. Particularly preferred is an addition of at least one alkylamine, of at least one amino alcohol and/or of at least one related amine, such as e.g. in each case at least one alkanolamine, aminoethanol, aminopropanol, diglycolamine, ethanolamine, ethylenediamine, monoethanolamine, diethanolamine and/or triethanolamine, especially dimethylethanolamine, 1-(dimethylamino)-2-propanol and/or 2-amino-2-methyl-1-propanol (AMP). The at least one organic salt, especially at least one salt of inorganic and/or organic cations, such as ammonium ions, can be formed for example by adding at least one neutralising agent to at least one ionomer and/or to at least one non-ionomer and/or to a mixture containing at least one of these polymeric organic materials and optionally at least one other component, such as e.g. at least two waxes and/or at least one additive. The salt formation can take place before and/or during the production of the lubricant composition and/or in the lubricant composition. The neutralising agent, especially at least one amino alcohol, often forms corresponding salts in the temperature range from room temperature to about 100° C., especially at temperatures in the range from 40 to 95° C., with at least one ionomer and/or with at least one non-ionomer. It is assumed that in some embodiments, especially at least one amino alcohol, the neutralising agent can react chemically with the water-soluble, water-containing and/or water-binding oxide and/or silicate, thus forming a reaction product which behaves advantageously for cold forming.

In several variants, it has proved advantageous to add at least one amine, especially at least one amino alcohol, to an individual ionomer, an individual non-ionomer, a mixture containing at least one ionomer and/or a mixture containing at least one non-ionomer in advance in the production of the aqueous lubricant composition. The prior addition is often advantageous to permit the reactions that form organic salts. The amines generally react with any organic polymeric material that contains carboxyl groups, provided the temperatures are sufficiently high for the reactions. These reactions preferably take place at around or above the temperatures of the melting point/melting range of the corresponding polymeric compounds. If the temperature remains below the melting point/melting range of the corresponding polymeric compounds, there will often be no reaction to form an organic salt. This will then be unable to facilitate the cleaning of the formed workpiece. As alternatives, the only possibilities then remaining are to react the corresponding polymeric compounds separately and expensively under high pressure and at elevated temperature and/or to add to the lubricant composition substances that have already been reacted in this manner. Aqueous lubricant compositions with an addition of ammonia should preferably not be heated above 30° C. Aqueous lubricant compositions with an addition of at least one amine are preferably kept in a temperature range of 60 to 95° C. in which many reactions to form amine salts take place.

The addition of at least one neutralising agent, such as e.g. at least one amine and/or at least one amino alcohol, helps to make the organic polymeric material more readily water-soluble and/or more readily water-dispersible. The reactions to form corresponding salts preferably take place with water-soluble and/or water-dispersible organic polymeric materials. It is particularly preferred for the at least one neutralising agent, especially at least one amine, to be added to the aqueous lubricant composition at an early stage during the mixing of the various components, as a result of which at least one organic polymeric material already contained and/or at least one organic polymeric material subsequently added is possibly at least partly neutralised.

Preferably, the neutralising agent is added in excess and/or is contained in the lubricant composition and/or in the coating in excess.

The at least one neutralising agent, especially the at least one amino alcohol, can also be used here to adjust the pH of a mixture or of the aqueous lubricant composition.

The organic salts have the advantage over the ionomers and/or over the non-ionomers that they are often more readily water-soluble and/or more readily water-dispersible than the corresponding ionomers and/or non-ionomers. As a result, the coatings and deposits from cold forming can generally be removed from the formed workpiece more readily. With the organic salts, lower softening ranges/softening points and/or lower melting ranges/melting points are frequently obtained, which is often advantageous. Better lubricating properties may also be obtained for the desired processing conditions.

As organic salts, amine salts and/or organic ammonium salts are particularly preferred. Amine salts are especially preferred since, after the application of the aqueous lubricant composition, these do not modify the composition thereof to any great extent and they exhibit relatively high water-solubility and/or water-dispersibility and therefore contribute to the comparatively easy removal of the coat and deposits from the formed workpiece after cold forming. With the organic ammonium salts, on the other hand, after application of the lubricant composition ammonia rapidly escapes, which not only may represent an unpleasant odour but also causes a back reaction of the ammonium salts to the original organic polymeric substances, which are then more difficult to remove than the amine salts at a later stage. Coatings are thereby obtained which have very good chemical and water resistance. When hydroxide(s) is/are used as neutralising agent, very hard and brittle, but water-sensitive, coatings are often obtained.

The content of the at least one neutralising agent, especially also of the at least one amino alcohol, in the lubricant composition can—especially depending on the acid value of the ionomer or non-ionomer—preferably be zero at the beginning of the neutralisation reaction or in the range from 0.05 to 15, from 0.2 to 12, from 0.5 to 10, from 0.8 to 8, from 1 to 6, from 1.5 to 4 or from 2 to 3 wt. % of the solids and active substances. Higher contents may be advantageous in some embodiments, especially with an addition of at least one amine, whereas with an addition of ammonia and/or at least one hydroxide in most embodiments rather lower contents are selected. The weight ratio of the contents of neutralising agent(s), especially also of amino alcohol(s), to contents of ionomer(s) and/or non-ionomer(s) and/or to the total content of organic polymeric material is preferably in the range from 0.001:1 to 0.2:1, particularly preferably in the range from 0.003:1 to 0.15:1, from 0.006:1 to 0.1:1 or from 0.01:1 to 0.05:1.

The lubricant composition according to the invention and/or the coating formed therefrom preferably has/have no content of organic salt, or a content of at least one organic salt, which was preferably formed by neutralisation, in the range from 0.1 to 95 or 1 to 90 wt. % of the solids and active substances. The content of at least one salt is preferably 3 to 85, 8 to 80, 12 to 75, 20 to 70, 25 to 65, 30 to 60, 35 to 55 or 40 to 50 wt. % of the solids and active substances of the lubricant composition. The weight ratio of the contents of at least one organic salt to contents of ionomer(s) and/or non-ionomer(s) in the lubricant composition and/or in the coating is preferably in the range from 0.01:1 to 100:1, particularly preferably in the range from 0.1:1 to 95:1, from 1:1 to 90:1, from 2:1 to 80:1, from 3:1 to 60:1, from 5:1 to 40:1 or from 8:1 to 20:1.

Waxes:

According to the definition used in this application, a wax is intended to mean a compound which has a defined melting point, which has a very low viscosity in the molten state and which is able to occur in crystalline form. A wax typically has no, or no substantial, content of carboxyl groups, is hydrophobic and is to a great extent chemically inert.

The lubricant composition and/or the coating formed therefrom can preferably contain at least two waxes, especially in each case at least one paraffin wax, carnauba wax, silicone wax, amide wax, ethylene- and/or propylene-based wax and/or crystalline wax. In particular, it can be used to increase the surface slip and/or penetration properties of the coating that forms and/or has formed, for the separation of workpiece and tool and to reduce friction. Preferably, a total content of at least two waxes in the range from 0.05 to 60 wt. % of the solids and active substances is contained in the lubricant composition and/or in the coating, particularly preferably and especially depending on the conditions of use and overall chemical composition for example in the range from 0.5 to 52, 1 to 40, 2 to 35, 3 to 30, 4 to 25, 5 to 20, 6 to 15, 7 to 12 or 8 to 10 wt. % of the solids and active substances. The content of the individual wax is preferably in the range from 0.05 to 36 wt. % of the solids and active substances in the lubricant composition and/or in the coating in each case, particularly preferably in the range from 0.5 to 30, 1 to 25, 2 to 20, 3 to 16, 4 to 12, 5 to 10 or 6 to 8 wt. % of the solids and active substances.

At least one wax can preferably have an average particle size in the range from 0.01 to 15 µm, particularly preferably in the range from 0.03 to 8 µm or 0.1 to 4 µm. With these particle sizes, it can be advantageous in many embodiments if the wax particles project at least partly from the coating formed.

Even if ionomers or wax-like non-ionomers have properties partly similar to waxes, they can at best replace the waxes only where the demands placed on the cold forming are low or where the ionomer content is extraordinarily high. In most embodiments, however, an addition of at least two waxes to the lubricant composition and/or in the coating is to be preferred; a content of at least two waxes with markedly different properties is especially advantageous. The at least partly softened or at least partly melting coating can attach to the workpiece to be formed during cold forming and can form a separating film between workpiece and tool. As a result of this, for example ridges in the workpiece can be avoided.

The weight ratio of the total contents of at least two waxes to the total content of ionomer(s) and/or non-ionomer(s) in the lubricant composition and/or in the coating formed therefrom is preferably in the range from 0.01:1 to 8:1, particularly preferably in the range from 0.08:1 to 5:1, from 0.2:1 to 3:1, from 0.3:1 to 2:1, from 0.4:1 to 1.5:1, from 0.5:1 to 1:1 or from 0.6:1 to 0.8:1. As a result of this, different content ranges can be particularly advantageous: in some cases very low, and in other cases very high contents. A comparatively very high wax content is recommended for slide drawing, deep drawing and light to moderately heavy cold massive forming operations. A comparatively low wax content has proved adequate for heavy cold extrusion or difficult slide drawing operations, such as e.g. of solid parts and of particularly thick wire.

Particularly preferred is a content of two, three, four or more than four different waxes, especially those that have distinctly different melting ranges/melting points and/or viscosities. It is preferred in this case that the coating formed from the lubricant composition has several consecutive softening ranges/softening points and/or melting ranges/melting points over a relatively large temperature range, which is passed through when the metallic workpiece heats up as a result of cold forming, especially so that there is a substantially continuous change or an approximately graduated change in the thermal and/or mechanical properties and/or the viscosity of the coatings during cold forming.

The waxes in the coatings formed from the lubricant composition often have at least one melting range/melting point in the range from 50 to 120° C. (e.g. paraffin waxes), from 80 to 90° C. (e.g. carnauba waxes), from 75 to 200° C. (e.g. amide waxes), from 90 to 145° C. (e.g. polyethylene waxes) or from 130 to 165° C. (e.g. polypropylene waxes); In the case of melting ranges instead of melting points, the average value of the melting range is used for the sake of simplicity. To detect melting ranges/melting points, a DSC (Differential Scanning calorimetry) 822e thermoanalytical instrument from Mettler was used. The measurements took place in an inert nitrogen atmosphere at a rate of heating of 10 K/min and with a weighed sample of 5 to 20 mg in aluminium crucibles with perforated lids. The evaporation behaviour can also be evaluated to a certain extent during this process.

Low-melting-point waxes can also be used in the initial stage of cold forming, especially with a cold workpiece and a cold tool, so that lubrication is already ensured and friction reduced. In addition, it may even be advantageous to use at least two low-melting-point waxes—e.g. with at least one melting range/melting point $T_m$ in the range from 60 to 90 or 65 to 100° C.—and/or at least two high-melting-point waxes—e.g. with at least one melting range/melting point $T_m$ in the range from 110 to 150 or 130 to 160° C. This is especially advantageous if these waxes have distinctly different viscosities at those low or high temperatures in the range of the melting range/melting point, as a result of which a specific viscosity can be established in the heated and/or melting lubricant composition. Thus, for example, a high-melting-point amide wax may be less viscous than a high-melting-point polyethylene and/or polypropylene wax.

It has proved particularly advantageous if at least one low-melting-point wax as well as at least one high-melting-point wax are contained in the lubricant composition and/or in the coating formed therefrom, the melting ranges/melting points $T_m$ of which are at least 20° C., preferably in each case at least 30, 40, 50, 60, 70 or 80° C. apart. However, if more than two waxes with markedly different properties are contained in the lubricant composition and/or in the coating formed therefrom, it can be advantageous if their melting points are, at least in some cases, no more than 50 or no more than 60° C. apart, unless waxes with markedly different viscosities are combined together.

In many embodiments, the coatings formed from the lubricant compositions with a content of at least two waxes have a total of at least two ranges and/or peaks of melting over the temperature range from 40 to 260° C., at least two of which are at least 30° C. apart. In many embodiments according to the invention, the coatings formed from the lubricant compositions with a content of at least two waxes have in each case at least one range and/or peak of melting over the temperature range from 40 to 129° C. and from 130 to 260° C. In many embodiments according to the invention, the coatings formed from the lubricant compositions with a content of at least two waxes display endothermic ranges and/or peaks of melting during thermal analysis, e.g. in DSC apparatus, of which at least one range and/or peak falls in the temperature range from 40 to 109° C. and of which at least one range and/or peak falls in the temperature range from 110 to 260° C.

The waxes are preferably selected according to the application conditions, i.e. according to the workpiece and its complexity, the forming process, how heavy the cold forming is and the maximum temperatures to be expected on the surface of the workpiece, but possibly also with regard to certain melting ranges/melting points over the desired processing range, especially over the desired temperature range.

Solid Lubricants and Friction Modifiers:

The lubricant composition and/or the coating formed therefrom can contain at least one solid lubricant and/or at least one friction modifier. In particular, at least one such addition in the lubricant composition, in the coating formed therefrom and/or in the film formed on a coating based on at least one solid lubricant is advantageous if high degrees of deformation are required. The total content of at least one solid lubricant and/or at least one friction modifier in the lubricant composition and/or in the coating formed therefrom is preferably either zero or in the range from 0.5 to 50, 1 to 45, 3 to 40, 5 to 35, 8 to 30, 12 to 25 or 15 to 20 wt. % of the solids and active substances.

If necessary, on the one hand at least one solid lubricant can be added to the lubricant composition and/or on the other hand a film containing at least one solid lubricant can be applied to the coating produced with an aqueous lubricant composition. It is conventional to work with at least one solid lubricant when the solid-lubricant-free coating is no longer adequate for the nature and heaviness of the cold forming and for the complexity of the workpiece but there is a risk of cold welding occurring between workpiece and tool, relatively large dimensional inaccuracies occurring on the formed workpiece and/or lower degrees of deformation being achieved than expected under the working conditions, since attempts will generally be made to work without solid lubricant for as long as possible.

Molybdenum disulfide, tungsten sulfides, bismuth sulfides and/or amorphous and/or crystalline carbon can preferably be used as solid lubricant. It is preferable, for reasons of environmental protection among others, to work without heavy metals. All these solid lubricants have the disadvantage of producing severe discoloration and severe contamination. The sulfidic solid lubricants have the disadvantage that the sulfides are not resistant to hydrolysis and are readily converted to sulfurous acid. The sulfurous acid can readily cause corrosion if the solid-lubricant-containing coating and the solid-lubricant-containing deposits are not removed from the workpiece immediately after cold forming.

The sulfidic solid lubricants are needed especially for heavy cold forming and the moderate to high temperature arising during this operation. The carbon additions are advantageous especially at a very high temperature and for a relatively high strain. Whereas molybdenum disulfide can be used up to temperatures of about 450° C., graphite can be employed up to temperatures of about 1100° C., although its lubricant action during cold forming only starts at about 600° C. A mixture of molybdenum disulfide powder, preferably particularly finely ground, together with graphite and/or amorphous carbon is therefore often used. However, an addition of carbon can lead to an undesirable carburisation of a ferrous material. And a sulfide addition can even lead to inter-crystalline corrosion in stainless steel.

The lubricant composition in accordance with the invention and/or the coating formed therefrom preferably has/have no content of solid lubricant or a content of at least one solid lubricant in the range from 0.5 to 50, 1 to 45, 3 to 40, 5 to 35, 8 to 30, 12 to 25 or 15 to 20 wt. % of the solids and active substances.

Among the other friction modifiers, for example at least one of the following substances can be used in the lubricant composition: alkali nitrate, alkali formate, alkali propionate, phosphoric acid ester—preferably as an amine salt, thiophosphate such as e.g. zinc dialkyl dithiophosphate, thiosulfate and/or alkali pyrophosphate—the latter preferably combined with alkali thiosulfate. In many embodiments they take part in the formation of a protective layer and/or a separating layer for separating workpiece and tool and help to avoid cold welds between workpiece and tool. However, in some cases they can have a corrosive effect, as the additives containing phosphorus and/or sulfur can react chemically with the metallic surface.

The lubricant composition in accordance with the invention and/or the coating formed therefrom preferably has/have no content of friction modifier or a content of at least one friction modifier in the range from 0.05 to 5 or 0.1 to 4 wt. % of the solids and active substances, particularly preferably in the range from 0.3 to 3, from 0.5 to 2.5 or from 1 to 2 wt. %.

Additives:

The lubricant composition and/or the coating formed therefrom can contain at least one additive in each case. It/they can contain at least one additive selected from the group consisting of anti-wear additives, silane additives, elastomers, film-forming auxiliaries, anti-corrosion agents, surfactants, defoamers, flow promoters, biocides, thickeners and organic solvents. The total content of additives in the lubricant composition and/or in the coating formed therefrom is preferably in the range from 0.005 to 20, 0.1 to 18, 0.5 to 16, 1 to 14, 1.5 to 12, 2 to 10, 2.5 to 8, 3 to 7 or 4 to 5.5 wt. % of the solids and active substances. Thickeners based on non-ionomers are excluded from these contents and are taken into account in the non-ionomers. According to the planned application conditions and cold-forming operations, and according to the formulation of the lubricant composition and/or of the coating, the content and the selection of additives can vary within broad limits.

Furthermore, preferably at least one of the following substances can be/have been used in the lubricant composition and/or in the coating formed therefrom to act as an anti-wear additive and/or as a friction modifier: organic polymeric substances with elevated temperature stability, such as e.g. polyamide powder and/or fluorine-containing polymer such as e.g. PTFE—both of these classes of substances belonging to the non-ionomers, silanes/silanols/siloxanes (=silane additive), polysiloxanes, but also in particular calcium-containing phosphates can act in this way. The lubricant composition in accordance with the invention and/or the coating formed therefrom preferably has/have no content of anti-wear organic substance or a content of at least one anti-wear organic substance in the range from 0.1 to 10 or 0.5 to 8 wt. % of the solids and active substances. This content is preferably 1 to 6, 2 to 5 or 3 to 4 wt. % of the solids and active substances.

In tests, various aqueous solutions with at least one silane additive in concentrations in the range from 5 to 50 wt. %, especially also an 8%, a 12% and an 18% solution, based on at least one silane/silanol/siloxane based on γ-aminopropyltriethoxysilane, diaminosilane and/or 1,2-bis(trimethoxy-silyl)ethane, were used to pre-rinse the phosphatised workpiece, dried and then coated with the lubricant composition. Alternatively, this solution can also be mixed into the aqueous lubricant composition. In both variants, this addition had the effect of significantly improving the sliding property. In particular for this purpose, in each case at least one acyloxysilane, alkoxysilane, silane with at least one amino group such as an aminoalkylsilane, silane with at least one succinic acid group and/or succinic anhydride group, bis-silyl silane, silane with at least one epoxy group such as a glycidoxy silane, (meth)acrylatosilane, multi-silyl silane, ureido silane, vinyl silane and/or at least one silanol and/or at least one siloxane of a chemically corresponding composition such as the previously mentioned silanes can be contained in the lubricant composition and/or in the coating.

It can preferably contain at least one elastomer, especially a hydroxy-terminated polysiloxane preferably with a molecular weight greater than 90 000, to increase the sliding property and scratch resistance, especially with a content of 0.01 to 5 or 0.2 to 2.5 wt. % of the solids and active substances of the lubricant composition and/or of the coating.

It can preferably contain at least one film-forming auxiliary for the production of a largely or completely continuous organic coating. In most embodiments, the coating for cold forming will not be completely continuous, which is totally adequate for these intended uses if it is then removed from the formed workpiece again. If, however, the coating is at least partly to remain on the formed workpiece at least partly, the addition of at least one film-forming auxiliary may be advantageous in some embodiments. A film formation under the action of the at least one film-forming auxiliary can take place in particular together with corresponding non-ionomers and, for example, with water glass. The film can be formed in particular together with ionomers, non-ionomers and, for example, with water glass. The addition of film-forming auxiliary/auxiliaries is especially worthwhile in coatings which are intended to remain at least partly on the formed workpiece after cold forming, such as e.g. in steering assembly parts. As a result of this, the workpiece can be permanently protected against corrosion there. Long-chain alcohols and/or alkoxylates are conventionally used as film-forming auxiliaries. Preferably in each case at least one butanediol, butyl glycol, butyl diglycol, ethylene glycol ether and/or in each case at least one polypropylene glycol ether, polytetrahydrofuran, polyether polyol and/or polyester polyol is used. The content of film-forming auxiliary/auxiliaries in the lubricant composition is preferably in the range from 0.03 to 5 wt. % of the solids and active substances of the lubricant composition and/or of the coating, particularly preferably 0.1 to 2 wt. %. The weight ratio of the contents of organic film former to contents of film-forming auxiliaries in the lubricant composition is preferably in the range from 10:1 to 400:1, from 20:1 to 250:1 or from 40:1 to 160:1, particularly preferably in the range from 50:1 to 130:1, from 60:1 to 110:1 or from 70:1 to 100:1.

The lubricant composition in accordance with the invention can preferably contain at least one anti-corrosion agent, such as e.g. one based on carboxylate, dicarboxylic acid, organic amine salt, succinate and/or sulfonate. An addition of this type may be advantageous especially in coatings which are intended to remain on the formed workpiece permanently, at least in part, and/or where there is a risk of corroding, e.g. flash rusting. The at least one anti-corrosion agent is preferably contained in a content of 0.005 to 2 wt. % of the solids and active substances of the lubricant composition and/or of the coating, particularly preferably 0.1 to 1.2 wt. %.

The lubricant composition can preferably contain in each case at least one surfactant, defoamer, flow promoter and/or biocide. These additives are preferably contained in a content of 0.005 to 0.8 wt. % of the solids and active substances of the lubricant composition and/or of the coating in each case, particularly preferably 0.01 to 0.3 wt. %.

A surfactant can act as a flow promoter. At least one surfactant can, in particular, be a non-ionic surfactant; this is preferably an ethoxylated fatty alcohol with 6 to 20 ethylene oxide groups. The at least one surfactant is preferably contained in a content of 0.01 to 2 wt. %, particularly preferably 0.05 to 1.4 wt. %. The addition of a defoamer may, under certain circumstances, be advantageous in order to inhibit the tendency towards foam formation, which can be reinforced or caused in particular by an added surfactant.

The lubricant composition can preferably contain at least one thickener, which, as a polymeric organic thickener, belongs to the non-ionomers and otherwise belongs not to the non-ionomers but to the additives. It is preferable to use for this purpose in each case at least one primary and/or tertiary amine-containing compound, cellulose, cellulose derivative, silicate, such as e.g. one based on bentonite and/or at least one other sheet silicate, starch, starch derivative and/or sugar derivative. It is preferably contained in the lubricant composition and/or in the coating formed therefrom in a content of 0.1 to 12 or 1 to 6 wt. % of the solids and active substances of the lubricant composition and/or of the coating.

In addition, at least one organic solvent and/or at least one solubility promoter can optionally also be added to and/or contained in the lubricant composition.

Preferably, no contents or no very high contents (e.g. less than 0.5 wt. % of the solids and active substances of the lubricant composition and/or of the coating) of chlorine-containing compounds, fluorine-containing compounds, such as in particular fluorine-containing polymers/copolymers, compounds based on or with a content of isocyanate and/or isocyanurate, melamine resin, phenolic resin, polyethylene imine, polyoxyethylene, polyvinyl acetate, polyvinyl alcohol, polyvinyl ester, polyvinylpyrrolidone, substances having a relatively strong corrosive action, environmentally unfriendly and/or toxic heavy metal compounds, borates, chromates, chromium oxides, other chromium compounds, molybdates, phosphates, polyphosphates, vanadates, tungstates, metal powders and/or of a soap conventional in cold forming, such as alkali and/or alkaline-earth stearates and/or other derivatives of fatty acids with a chain length in the range from about 8 to about 22 carbon atoms, are contained in the lubricant composition and/or in the coating formed therefrom. Especially in embodiments which are free of non-polymers, it is preferred not to add any film-forming auxiliary to the lubricant composition.

Overall Composition:

In many embodiments, the lubricant composition has a solids and active substances content preferably in the range from 2 to 95 wt. %, especially in the range from 3 to 85, 4 to 70 or 5 to 50, 10 to 40, 12 to 30 or 15 to 22 wt. %, the remaining contents to 100 wt. % being either only water or predominantly water with contents of at least one organic solvent and/or at least one solubility promoter. The aqueous lubricant composition is preferably kept in motion before it is applied on to the metallic surface.

The aqueous lubricant composition, when used as a so-called concentrate, can have a solids and active substances content preferably in the range from 12 to 95, 20 to 85, 25 to 70 or 30 to 55 wt. %, and as an application mixture ("bath") preferably in the range from 4 to 70, 5 to 50, 10 to 30 or 15 to 22 wt. %. With low concentrations, the addition of at least one thickener may be advantageous.

In the process according to the invention, the metallic shaped articles to be cold-formed can be wetted with the lubricant composition preferably over a period of 0.1 seconds to 1 hour. The wetting period may depend on the nature, shape and size of the metallic shaped articles and on the desired film thickness of the coating to be produced, with e.g. long tubes often being introduced obliquely into the lubricant composition so that the air can escape particularly from the interior of the tube over a prolonged period. The application of the aqueous lubricant composition on to the workpiece can take place using any methods conventional in surface finishing, e.g. by manual and/or automatic application, by spraying and/or dipping and optionally also by squeezing and/or rolling, optionally in a continuous dipping process.

To optimise the lubricant composition, particular attention should be paid to adjusting the pH value, to the viscosity at the elevated temperatures occurring and to the selection of the substances to be added for graduated softening ranges/softening points and/or melting ranges/melting points of the various components of the lubricant composition.

The metallic shaped articles to be cold-formed can be wetted with the lubricant composition here at a temperature preferably in the range from room temperature to 95° C., especially at 50 to 75° C. If the temperature is less than 45° C. when wetting the metallic shaped article, drying generally takes place very slowly without any additional measures, such as e.g. blowing with a relatively strong hot air current or treatment with radiant heat; moreover, when drying is too slow, an oxidation of the metallic surface a corroding such as e.g. flash rust can occur.

A coating is formed from the lubricant composition here, the chemical composition of which does not have to correspond to the starting composition and the phase content of the aqueous lubricant composition in every variant, but which corresponds largely or completely in very many variants. In most variants, no crosslinking reactions, or hardly any, take place; since in most embodiments, it is predominantly or entirely a case of the aqueous lubricant composition drying on the metallic surface.

Preferably, the added substances are selected so that the softening ranges/softening points and/or melting ranges/ melting points of the individual polymeric components (monomers, comonomers, oligomers, co-oligomers, polymers and/or copolymers of the polymeric organic material), and optionally also of the waxes and any jointly acting additives, are distributed over the temperature range which is limited by the markers of ambient temperature or elevated temperature in the range from 20, 50, 100, 150 or 200° C. to 150, 200, 250, 300, 350 or 400° C. As a result of the distribution of the softening ranges/softening points and/or melting ranges/melting points of the individual organic polymeric components, e.g. over 20 to 150° C., over 30 or 80 or 120 to 200° C., over 50 or 100 or 150 to 300° C., friction is eased in every temperature range passed through during cold forming by at least one softened and/or molten substance in each case and, as a result, cold forming is generally also guaranteed.

Coatings:

The lubricant layer produced with the lubricant composition in accordance with the invention (=coating) typically has a composition which is largely to completely identical with the composition of the aqueous lubricant composition, apart from the content of water, optionally organic solvent and optionally other evaporating components and any condensation, crosslinking and/or chemical reactions that may occur.

The coating produced with the lubricant compositions in accordance with the invention is generally intended to facilitate cold forming and then to be removed from the formed workpiece. In special embodiments, such as e.g. in axles and steering assembly parts, the composition in accordance with the invention can be formulated so that the coating is particularly suitable to remain permanently on a formed workpiece, e.g. by using a content of at least one hardener for a thermal crosslinking, at least one resin which is suitable for radical curing, such as e.g. UV curing, at least one photoinitiator, e.g. for UV curing, and/or at least one film-forming auxiliary in order to produce a particularly high-grade coating which is continuous in many variants. The hardened, crosslinked and/ or post-crosslinked coatings can represent increased corrosion resistance and hardness compared with the coatings of the other embodiments.

As particularly high-grade coatings for higher or for the highest mechanical and/or thermal demands, those in which the liquid, drying and/or dry coating, which was applied with the aqueous lubricant composition according to the invention, displays no marked softening and/or only limited softening up to temperatures of at least 200° C. and/or only limited softening or no softening up to at least 300° C., have proved suitable.

For wire drawing it has proved advantageous if, at the surface temperatures of the wire during wire drawing, a softening and/or melting occurs, because then uniform, attractive, lint-free metallic surfaces are formed. The same applies to other slide-drawing processes and to light to moderate cold extrusion.

The coating applied from the aqueous lubricant composition preferably has a coating weight in the range from 0.3 to 15 g/m$^2$, especially from 1 to 12, from 2 to 9 or from 3 to 6 g/m$^2$. The coating thickness of the coating is adjusted according to the application conditions and can be present here especially in a thickness in the range from 0.25 to 25 μm, preferably in the range from 0.5 to 20, from 1 to 15, from 2 to 10, from 3 to 8 or from 4 to 6 μm.

As the workpieces to be formed, strips, sheets, slugs (=wire sections, profile sections, blanks and/or tube sections), wires, hollow profiles, solid profiles, bars, tubes and/or shaped articles with more complex shapes are usually used.

The metallic shaped articles to be cold-formed can, in principle, consist of any metallic material. They preferably consist substantially of steel, aluminium, aluminium alloy, copper, copper alloy, magnesium alloy, titanium, titanium alloy, especially of structural steel, high-tensile steel, stainless steel and/or metal-coated steel, such as e.g. aluminised or galvanised steel. The workpiece usually consists substantially of steel.

If necessary, the metallic surfaces of the metallic workpieces to be cold-formed and/or the surfaces of their metal-coated coating can be cleaned in at least one cleaning process before being wetted with the aqueous lubricant composition, all cleaning processes being suitable in principle for this purpose. The chemical and/or physical cleaning can particularly comprise peeling, abrasive blasting such as e.g. annealing, sandblasting, mechanical descaling, alkaline cleaning and/or acid pickling. The chemical cleaning preferably takes place by degreasing with organic solvents, by cleaning with alkaline and/or acidic cleaners, with acidic pickles and/or by rinsing with water. Pickling and/or abrasive blasting is primarily used to descale the metallic surfaces. Preferred methods are e.g. only to anneal a welded tube of cold-rolled strip after welding and scraping, e.g. to pickle, rinse and neutralise a seamless tube and e.g. to degrease and rinse a stainless steel slug. Parts made of stainless steel can be brought into contact with the lubricant composition both moist and dry, since no rusting is to be expected.

If necessary, the metallic shaped articles to be cold-formed can be pre-coated before wetting with the lubricant composition in accordance with the invention. The metallic surface of the workpiece can, if necessary, be provided with a metallic coat before wetting with the lubricant composition in accordance with the invention, said coat consisting substantially of a metal or of a metal alloy (e.g. aluminised or galvanised). On the other hand, the metallic surface of the workpiece or its metal-coated coating can be provided with a conversion coating, especially oxalated or phosphatised. The conversion coating can preferably take place with an aqueous composition based on oxalate, alkali phosphate, calcium phosphate, magnesium phosphate, manganese phosphate, zinc phosphate or corresponding mixed crystal phosphate, such as e.g. ZnCa phosphate. Often, the metallic shaped articles are also wetted with the lubricant composition in accordance with the invention uncoated, i.e. without a previous conversion coating. However, this is only possible if the metallic surface of the workpiece to be formed has previously been chemically and/or physically cleaned.

The metallic shaped articles are preferably dried thoroughly, especially with hot air and/or radiant heat, after being coated with the lubricant composition. This is often necessary because water contents in coatings generally cause problems during cold forming since otherwise the coating cannot be formed adequately and/or because a coating of poorer quality may be formed. In this case, corrosion can often also occur quickly.

Surprisingly, with adequate drying, the coating in accordance with the invention is of such good quality that, with careful handling, the metal-coated shaped article is not damaged and also is not partly eroded.

The metallic shaped articles coated in accordance with the invention can be used for cold forming, especially for slide drawing e.g. of tubes, hollow profiles, rods, other solid profiles and/or wires, for ironing and/or deep drawing e.g. of strips, sheets and/or hollow parts, e.g. to form hollow parts, for cold extrusion, e.g. of hollow and/or solid parts and/or for cold heading e.g. of wire sections to form joining elements such as e.g. nuts and/or screw blanks, it being possible also to carry out several, optionally even several different, cold-forming operations in succession in some cases.

In the process according to the invention, the formed workpiece can preferably be at least partly cleaned of the remaining coating and/or of the deposits of the lubricant composition after cold forming.

In the process according to the invention, the coating can, if necessary, remain on the formed workpieces permanently after cold forming, at least in part.

The object is also achieved by a lubricant composition according to the invention for application to a workpiece to be formed and for cold forming.

The object is also achieved by a coating which has been formed from a lubricant composition according to the invention.

It also relates to the use of a lubricant composition according to the invention for application to a workpiece to be formed and for cold forming as well as to the use of a coating according to the invention for cold forming and optionally also as a permanent protective coat.

Surprisingly, it has been found that even a very small addition of a water-soluble, water-containing and/or water-binding oxide and/or silicate, especially of water glass, but also a large addition leads to a marked improvement in the coating according to the invention, which leads to significantly improved cold forming under otherwise identical conditions and can be used for more severe cold forming than with comparable lubricant compositions that are free from these compounds. Moreover, the coating according to the invention can also be used without the addition of solid lubricants and without applying a separate solid lubricant coat in cold-forming operations with a greater action of force and at a higher temperature than comparable coatings without this addition. Furthermore, this addition also has a marked anti-corrosive action.

Surprisingly, it was also found that cold extrusion—especially of steel slugs—took place in accordance with the invention with particularly low friction and above all without breakage of the tool, even when significantly elevated forces were used. It is thus possible to produce coatings both for the area of extreme compression pressures and for the area of maximum wear reduction during cold forming, increased shaping accuracy and/or increased strain rate, which can be applied simply, reproducibly and cost-effectively in a one-pot process, e.g. by dipping, removing and drying.

EXAMPLES ACCORDING TO THE INVENTION AND COMPARATIVE EXAMPLES

An aqueous lubricant concentrate was prepared, while stirring vigorously with a high-speed mixer, taking deionised water and optionally an addition of a neutralising agent, such as e.g. an amino alcohol, as the initial charge. On the one hand, compositions (A) were prepared with an amino alcohol, which were initially held at temperatures in the range from 80 to 95° C., and on the other hand, compositions (B) were prepared with an ammonium content, which were held at room temperature and/or at up to 30° C. for the entire period. The contents of amino-alcohol and ammonium ions were used for neutralisation (=formation of an organic salt) and to obtain organic salts in the aqueous composition.

With the lubricant compositions (A) and (B) as mixtures, lubricant concentrates and baths, the same procedure was followed in principle. First, the at least one ionomer based on ethylene acrylate was added to the initial charge of water, partly as a dispersion. For this purpose, the mixture (A) continued to be held at temperatures in the range from 80 to 95° C. and to be stirred vigorously with a high-speed mixer to enable neutralisation and salt formation to take place. After some time, a transparent liquid was formed during this operation. With the mixtures (B), the at least one Ionomer based on ethylene acrylate in the form of at least one dispersion of at least one organic ammonium salt was added and vigorous stirring with a high-speed mixture continued. Then, the non-ionomers were added to the mixtures (A) and (B) first in dissolved and/or dispersed form and then in powdered form with vigorous and prolonged stirring using a high-speed mixer. For this purpose, in the mixtures (A) the temperature was reduced again to the range of 60 to 70° C. In addition, the other additives such as biocide, wetting agent and anti-corrosion agent were added as required and finally at least one thickener to adjust the viscosity. If required, each concentrate was filtered and the pH was adjusted. To coat the metallic workpieces to be formed, each concentrate was diluted appropriately with deionised water and, if necessary, the pH was adjusted. The baths with the aqueous lubricant composition were permanently stirred gently and held at a temperature in the range from 50 to 70° C. (baths A) or from 15 to 30° C. (baths B).

Slugs of hardened carbon steel C15, 1.0401 from 90-120 HB with a diameter of approx. 20 mm and a height of approx. 20 mm were phosphatised non-electrolytically (=electrolessly) with ZnCa phosphate with a zinc-calcium ratio of 70:30. The coating of the phosphatised slugs with the polymeric aqueous lubricant composition, mostly according to the invention, took place by dipping for 1 min and then drying for 10 min at 60 to 65° C. in a circulating air oven. These double-coated, dried slugs were then cold-formed in a press by reverse extrusion at 300 t.

In the tables, the lubricant compositions and the suitability of the coatings formed therewith on ZnCa phosphate coats for specific cold-forming operations and their strain are given. The remainder to 100 wt. % is formed by the additives and solid lubricants, only the latter being listed. As ionomers, ethylene acrylates and/or ethylene methacrylates ("ethylene acrylate") were used. "Ammonium polymer" refers to organic polymeric ammonium salts of the non-ionomers, which were added as dispersions. Among the additives, only the solid lubricants are listed, which is why the sum of the solids and active substances does not add up to 100 wt. %. The ionomers of types A and C have a somewhat higher molecular weight and a significantly higher melt viscosity (viscosity at high temperature, especially in the range of softening and/or melting) than the ionomers of types B and D. The ionomers of types A and B were reacted with an amino alcohol during the production of the aqueous lubricant composition. The ionomers of types C and D have an ammonium content and were already added as organic salts.

TABLE 1

Compositions of the aqueous lubricant compositions, giving the solids and active substances in wt. % and the suitability of the coatings formed therewith on ZnCa phosphate coats for specific cold-forming operations and their strain for many different basic compositions with a varying wax content with differing strain.

| Example | E 1 | CE 1 | CE 2 | E 2 | E 3 | CE 3 | CE 4 |
|---|---|---|---|---|---|---|---|
| Ethylene acrylate ** | 9.3 | 16.8 | 16.8 | 23.5 | 21.1 | 31.8 | 31.8 |
| Ethylene acrylate type ** | B | B | B | B | B | B | B |
| Acrylic polymer | 6.8 | 21.6 | 21.6 | 13.2 | 12.2 | 17.8 | 17.8 |
| Styrene acrylate | — | — | — | — | — | — | — |
| Amino alcohol proportion * | 2.4 | 4.8 | 4.8 | 7.2 | 6.6 | 9.7 | 9.7 |
| Polymer thickener | 11.2 | 11.2 | 11.2 | 11.2 | 10.2 | 15.1 | 15.1 |
| Waxes | 52.2 | 26.1 | 26.1 | 43.5 | 48.5 | 21.8 | 21.8 |
| Number of waxes | 2 | 1 | 1 | 3 | 4 | 1 | 1 |
| $T_m$ of waxes ° C. | 68 + 148 | 68 | 148 | 68 + 143 + 148 | 68 + 85 + 143 + 148 | 85 | 148 |
| Water glass | 9.2 | 13.0 | 13.0 | 7.0 | 6.4 | 9.4 | 9.4 |
| Solid lubricants | — | — | — | — | — | — | — |
| pH | 9.4 | 9.6 | 9.6 | 9.3 | 9.3 | 9.4 | 9.4 |
| Possible uses | AZ GZ KFP KS TZ | GZ KS TZ | GZ KFP KS TZ | AZ GZ KFP KS TZ | AZ GZ KFP KS TZ | GZ KFP KS | GZ KFP KS |
| Max. strain. | moderate | light-moderate | moderate | heavy | moderate | moderate | heavy |

| Example | E4 | E5 | E6 | E7 | E8 | E9 | CE 5 |
|---|---|---|---|---|---|---|---|
| Ethylene acrylate ** | 29.7 | 34.0 | 65.5 | 95.2 | 89.2 | 85.5 | 90.8 |
| Ethylene acrylate type ** | B | B | A | A | A | A | A |
| Acrylic polymer | — | — | 0.8 | — | — | — | — |
| Styrene acrylate | 7.8 | — | 7.9 | 14.4 | — | — | — |
| Amino alcohol proportion * | 8.4 | 6.9 | 10.1 | 18.3 | 18.3 | 17.5 | 18.7 |
| Polymer thickener | 5.5 | — | — | — | — | — | — |
| Waxes | 32.5 | 50.4 | 20.2 | 28.2 | 6.0 | 8.0 | 4.0 |
| Number of waxes | 2 | 3 | 2 | 3 | 2 | 2 | 1 |
| $T_m$ of waxes ° C. | 85 + 148 | 68 + 143 + 148 | 85 + 148 | 68 + 85 + 148 | 85 + 148 | 85 + 148 | 85 |
| Water glass | 6.5 | 1.8 | 2.5 | 3.2 | 2.5 | 5.0 | 5.0 |
| Solid lubricants | — | — | — | — | — | — | — |
| pH | 9.5 | 9.5 | 9.3 | 9.6 | 9.8 | 9.8 | 9.8 |
| Possible uses | AZ GZ KFP KS TZ | AZ GZ KFP KS TZ | AZ GZ KFP KS TZ | KFP KS | GZ KFP | GZ KFP | KFP |
| Max. strain. | heavy | heavy | heavy | heavy | very heavy | moderate-heavy | moderate |

TABLE 1-continued

Compositions of the aqueous lubricant compositions, giving the solids and active substances in wt. % and the suitability of the coatings formed therewith on ZnCa phosphate coats for specific cold-forming operations and their strain for many different basic compositions with a varying wax content with differing strain.

| Example | E10 | E11 | E12 | E13 | E14 | E15 |
|---|---|---|---|---|---|---|
| Ethylene acrylate ** | 6.2 | 11.8 | 14.1 | 18.7 | 24.1 | 43.3 |
| Ethylene acrylate type ** | C + D | C + D | C + D | C | C | C |
| Acrylic polymer | 6.0 | — | — | — | 0.2 | 1.4 |
| Styrene acrylate | 14.3 | 9.2 | 11.9 | 15.9 | 3.6 | 2.8 |
| Waxes | 56.0 | 29.2 | 38.2 | 50.1 | 67.8 | 35.6 |
| Number of waxes | 3 | 3 | 3 | 3 | 2 | 3 |
| $T_m$ of waxes ° C. | 68 + 85 + 143 | 68 + 143 + 148 | 68 + 143 + 148 | 68 + 143 + 148 | 85 + 148 | 85 + 143 + 148 |
| Water glass | 4.0 | 1.8 | 2.5 | 5.2 | 3.4 | 8.7 |
| Solid lubricants | — | 39.9 Graphite | 21.0 $MoS_2$ | — | — | — |
| pH | 9.2 | 9.0 | 9.7 | 8.5 | 8.0 | 9.2 |
| Possible uses | GZ TZ | AZ GZ HF KFP | AZ GZ HF KFP TZ | AZ GZ TZ | AZ GZ KFP TZ | AZ GZ KFP TZ |
| Max. strain. | moderate | moderate-heavy | moderate-heavy | moderate-heavy | moderate-heavy | heavy |

Cold-forming operations:
AZ = ironing,
GZ = slide drawing,
HF = hydroforming,
KFP = cold extrusion,
KS = cold heading,
TP = orbital forming,
TZ = deep drawing
Solid lubricants:
G = graphite,
M = molybdenum disulfide
* = proportion excluded from calculation, and possibly excess proportion, so that the sum is more than 100 wt. % since at least some of the ionomers and non-ionomers are present as salts
** = ionomer In the tests in the tables, it was shown that the content of various components in the lubricant compositions in accordance with the invention can be varied to a broad extent. On the one hand, the addition of at least two waxes with graduated melting points and/or different viscosities, but also of at least one ionomer and/or of water glass, has proved particularly suitable here. The lubricant composition and the coating formed therefrom can substantially be used more readily or better for heavy forming operations if a relatively high content of ionomer(s) or an additional high content of at least one solid lubricant is contained. However, in by far the most embodiments, a content of at least two waxes is particularly advantageous or even necessary. The lubricant compositions of Examples 11 and 12 are particularly suitable for heavy cold forming, such as orbital forming, owing to the content of graphite and molybdenum disulfide respectively.

It was shown that the use of at least two waxes with markedly different physical properties is particularly advantageous and brought a considerable improvement for cold forming. If two waxes of similar or closely adjacent melting range/melting point were used, these had a markedly different viscosity. The viscosity of the two low-melting-point waxes and of the two high-melting-point waxes differed by at least 10% at the elevated or high temperature of cold forming, and in the two high-melting-point waxes probably by at least 20%. On the one hand the addition of at least one ionomer and optionally also of water glass, but also of two, three of four waxes with graduated melting ranges/melting points proved very advantageous here. If two waxes of similar or closely adjacent melting range/melting point were used, these had a markedly different viscosity so that the viscosity of the lubricant composition could be varied at high temperature and could be optimised with regard to the respective forming and application conditions.

The lubricant compositions according to the invention make environmentally friendly coatings possible, which are applied to metallic workpieces in a simple and cost-effective manner and are suitable for simple, moderately heavy and/or particularly heavy cold-forming operations. Owing to the use of organic salts, the coatings and corresponding deposits can be removed from the formed workpiece by simple means after cold forming.

The invention claimed is:

1. A process for the preparation of metallic workpieces for cold forming by applying a lubricant layer coating either on to a metallic surface or on to a pre-coated metallic surface and then coldforming the resultant coated metallic workpiece, wherein the lubricant layer is formed by contacting the surface with an aqueous lubricant composition which comprises a water-soluble, water-containing or water-binding oxide or silicate, at least two different waxes having different melting ranges, melting points or viscosities, an organic polymeric material that is an ionomer having a content of free or associate ions, wherein the organic polymeric material is selected from the group consisting of a polymer and a copolymer based on an ionomer having a content of free or associate ions, and a non-ionomeric organic component based on a member selected from the group consisting of an acrylic acid, a methacrylic acid, an amide, an amine, an aramid, an epoxide, an ethylene, an imide, a polyester, a propylene, a styrene and a urethane, and esters or salts thereof, wherein the coating formed from the lubricant composition has several consecutive softening ranges or softening points or melting ranges or melting points over a temperature range, which is passed through when the metallic workpiece heats up as a result of the coldforming so that there is a substantially continuous change or an approximately graduated change in the thermal or mechanical properties or the viscosity of the coatings during the cold forming, and wherein the water-soluble, water-containing or water-binding oxide or silicate is selected from the group consisting of water glass, silica gel, silica sol, silica hydrosol, silicic acid ester and ethyl silicate, wherein the non-ionomeric organic component is at least one member selected from the group consisting of an oligomer, a polymer and a copolymer;

wherein the ionomer is based on a member selected from the group consisting of acrylic acid, methacrylic acid, ethylene, propylene and styrene, or an ester or a salt thereof, wherein the ionomer is a copolymer; and wherein the ionomer is a polyelectrolyte.

2. A process according to claim 1, wherein the lubricant composition has a content of the water-soluble, water-containing or water-binding of from 0.1 to 85 wt. %, based on weight of solids and active substances.

3. A process according to claim 1, wherein the ionomer is a copolymer.

4. A process according to claim 1, wherein the lubricant composition or the coating formed therefrom has/have a content of at least one non-ionomer in the range from 0.1 to 90 wt. % of the solids and active substances.

5. A process according to claim 1, wherein at least one ionomer or at least one non-ionomer is at least partly neutralised, at least partly saponified or is at least partly present in the lubricant composition or in the coating as at least one organic salt.

6. A process according to claim 1, wherein the lubricant composition is neutralized with at least one primary amine, secondary amine, tertiary amine and ammonia.

7. A process according to claim 1, wherein at least one of the waxes is selected from the group consisting of paraffin wax, carnauba wax, silicone wax, amide wax, an ethylene-based wax, a propylene-based wax and crystalline wax.

8. A process according to claim 7, wherein the lubricant composition or the coating formed therefrom has/have a total content of at least two waxes in the range from 0.05 to 60 wt % of the solids and active substances.

9. A process according to claim 1, wherein, in the lubricant compositions or the coatings formed therefrom, waxes having a melting range or melting point $T_m$ which are at least 20° C. apart or the viscosities of which at a specific elevated or high temperature in the range of the surface temperatures of the workpiece to be formed during cold forming differ by at least 5% in their viscosity.

10. A process according to claim 9, wherein the ionomer is present in the lubricant composition in an amount of from 3 to 98 wt. % of solids and active substances.

11. A process according to claim 1, wherein the lubricant compositions or the coatings formed therefrom contain at least two types of organic polymeric substances selected from ionomers and non-ionomers, which, over the temperature range from 40 to 260° C., have a total of at least two ranges or peaks of softening or melting, at least two of which are at least 30° C. apart.

12. A process according to claim 1, wherein at least one of the two waxes have a range or peak of melting over the temperature range of from 40 to 129° C. and wherein the other wax has a range of peak of melting over the temperature range of from 130 to 260° C.

13. A process according to claim 1, wherein the lubricant composition or the coating formed therefrom contain at least one solid lubricant or at least one friction modifier.

14. A process according to claim 13, wherein the total content of at least one solid lubricant or at least one friction modifier in the lubricant composition or in the coating formed therefrom is either zero or in the range from 0.5 to 50 wt. % of the solids and active substances.

15. A process according to claim 1, wherein the lubricant composition or the coating formed therefrom contain at least one additive selected from the group consisting of solid lubricants, friction modifiers, wear-protection additives, silane additives, elastomers, film-forming auxiliaries, anti-corrosion agents, surfactants, defoamers, flow promoters, biocides, thickeners and organic solvents.

16. A process according to claim 15, wherein the total content of additives in the lubricant composition or in the coating formed therefrom is in the range from 0.005 to 20 wt. % of the solids and active substances.

17. A process according to claim 1, wherein the metallic surfaces of the metallic workpieces to be cold-formed or the surfaces of their metal-coated coating are cleaned in at least one cleaning process before being wetted with the aqueous lubricant composition.

18. A process according to claim 1, wherein the metallic surface of the workpiece or its metal-coated coating is provided with a conversion coating.

19. A process according to claim 18, wherein the conversion coating takes place with an aqueous composition based on oxalate, alkali phosphate, calcium phosphate, magnesium phosphate, manganese phosphate, zinc phosphate or corresponding mixed crystal phosphate.

20. A process according to claim 1, wherein the formed workpiece is at least partly cleaned of any remaining coating or of the deposits of the lubricant composition after cold forming.

21. A process according to claim 1, wherein at least a portion of the coating remains on the formed workpieces permanently after cold forming.

22. A process according to claim 1, wherein the water-soluble, water-containing or water-binding oxide or silicate is a water glass.

23. A process according to claim 22, wherein the water glass is at least one member selected from the group consisting of a lithium containing water glass, a sodium-containing water glass and a potassium-containing water glass.

24. A process according to claim 1, wherein the ionomer is present in the lubricant composition in an amount of from 3 to 98 wt. % of solids and active substances.

25. A process according to claim 1, wherein the coating produced with the lubricant compositions facilitates cold forming and is then removed from a formed workpiece.

26. A process according to claim 25, wherein the coating and any deposit from cold forming can be removed from the formed workpiece more readily compared to other coatings.

27. A process according to claim 25, wherein the salt is an amine.

* * * * *